(12) United States Patent
L'Abee et al.

(10) Patent No.: US 9,209,443 B2
(45) Date of Patent: Dec. 8, 2015

(54) LASER-PERFORATED POROUS SOLID-STATE FILMS AND APPLICATIONS THEREOF

(71) Applicant: SABIC Global Technologies B.V., Bergen op Zoom (NL)

(72) Inventors: Roy Martinus Adrianus L'Abee, Veldhoven (NL); Tony Farrell, Bergen op Zoom (NL)

(73) Assignee: SABIC Global Technologies B.V., Bergen op Zoom (NL)

( * ) Notice: Subject to any disclaimer, the term of this patent is extended or adjusted under 35 U.S.C. 154(b) by 85 days.

(21) Appl. No.: 14/150,846

(22) Filed: Jan. 9, 2014

(65) Prior Publication Data
US 2014/0193716 A1   Jul. 10, 2014

Related U.S. Application Data

(60) Provisional application No. 61/751,057, filed on Jan. 10, 2013.

(51) Int. Cl.
| | |
|---|---|
| *H01M 2/16* | (2006.01) |
| *H01M 2/14* | (2006.01) |
| *C08F 110/02* | (2006.01) |
| *B23K 26/38* | (2014.01) |
| *B23K 26/40* | (2014.01) |
| *H01M 8/10* | (2006.01) |
| *H01G 11/52* | (2013.01) |
| *H01M 4/68* | (2006.01) |
| *H01G 9/02* | (2006.01) |

(52) U.S. Cl.
CPC ............ *H01M 2/145* (2013.01); *B23K 26/381* (2013.01); *B23K 26/385* (2013.01); *B23K 26/4065* (2013.01); *C08F 110/02* (2013.01); *H01G 11/52* (2013.01); *H01M 2/162* (2013.01); *H01M 2/1653* (2013.01); *H01M 2/1666* (2013.01); *H01M 8/1067* (2013.01); *H01M 8/1069* (2013.01); *H01M 8/1079* (2013.01); *H01G 9/02* (2013.01); *Y02E 60/521* (2013.01); *Y10T 428/24273* (2015.01); *Y10T 428/24322* (2015.01)

(58) Field of Classification Search
USPC ........... 264/400; 361/500; 428/131, 137, 220; 429/247
See application file for complete search history.

(56) References Cited

U.S. PATENT DOCUMENTS

| | | |
|---|---|---|
| 5,268,321 A | 12/1993 | Shimizu et al. |
| 5,336,554 A | 8/1994 | Knight |
| 5,576,377 A | 11/1996 | El Sayed et al. |
| 5,977,514 A | 11/1999 | Feng et al. |
| 6,072,011 A | 6/2000 | Hoover |
| 6,207,344 B1 | 3/2001 | Ramlow et al. |
| 6,420,449 B1 | 7/2002 | Sagane et al. |
| 6,627,299 B1 | 9/2003 | Feng et al. |
| 6,631,977 B2 | 10/2003 | Andrews |
| 6,723,864 B2 | 4/2004 | Silva et al. |
| 7,083,837 B1 | 8/2006 | Varriano-Marston |
| 7,223,512 B2 | 5/2007 | Lutz et al. |
| 7,459,259 B2 | 12/2008 | Engel et al. |
| 8,343,412 B2 | 1/2013 | Klein et al. |
| 2003/0025008 A1 | 2/2003 | Srinivasan |
| 2003/0188428 A1 | 10/2003 | Echigo et al. |
| 2004/0039145 A1 | 2/2004 | Silva et al. |
| 2004/0059068 A1 | 3/2004 | Nodera |
| 2004/0132892 A1 | 7/2004 | Kawakami et al. |
| 2005/0217790 A1 | 10/2005 | Joachimi et al. |
| 2006/0065521 A1 | 3/2006 | Liu et al. |
| 2006/0183011 A1 | 8/2006 | Mittelsteadt et al. |
| 2009/0130451 A1 | 5/2009 | Farrell |
| 2011/0200801 A1 | 8/2011 | Pudleiner et al. |
| 2011/0262693 A1 | 10/2011 | Mittelsteadt et al. |
| 2012/0187672 A1 | 7/2012 | Sakagami et al. |
| 2012/0244412 A1 | 9/2012 | Pascaly et al. |
| 2012/0316280 A1 | 12/2012 | Meyer et al. |

FOREIGN PATENT DOCUMENTS

| | | |
|---|---|---|
| CN | 101552328 | 10/2009 |
| DE | 19647543 | 5/1998 |
| EP | 0566312 | 10/1993 |
| EP | 0953399 | 11/1999 |
| EP | 1507299 | 2/2005 |
| EP | 1925427 | 5/2008 |
| EP | 2305460 | 4/2011 |
| EP | 2399740 | 12/2011 |
| JP | 1016390 | 1/1998 |

(Continued)

OTHER PUBLICATIONS

Aoyama et al., "Study on Small Diameter Drilling in GFRP", Composite Structures, 1995, 32(1-4), 567-573.

(Continued)

*Primary Examiner* — Terressa Boykin
(74) *Attorney, Agent, or Firm* — Baker Hostetler LLP

(57) ABSTRACT

The disclosure relates, in one aspect, to porous solid-state films with controlled pore structures obtained by laser perforation. A thin laser-perforated film can comprise a slab defining a plurality of pores distributed in a predetermined arrangement, the plurality of pores having a distribution of sizes bound by a predetermined magnitude. In an aspect, the plurality of pores are formed in the slab with a laser having a wavelength less than about 400 nm and the slab has a transmission of the laser light of equal to or less than about 70% measured at a thickness of the slab of 100 micrometer or less.

24 Claims, 10 Drawing Sheets

(56) References Cited

FOREIGN PATENT DOCUMENTS

| | | |
|---|---|---|
| JP | 10330521 | 12/1998 |
| JP | 2001/164082 | 6/2001 |
| JP | 2001/319635 | 11/2001 |
| JP | 2002/003548 | 1/2002 |
| JP | 2002/309104 | 10/2002 |
| JP | 2003/321615 | 11/2003 |
| JP | 2004/247123 | 9/2004 |
| JP | 2009/012276 | 1/2009 |
| JP | 2009/045911 | 3/2009 |
| JP | 2009/051872 | 3/2009 |
| JP | 2009/270002 | 11/2009 |
| WO | WO 98/030317 | 7/1998 |
| WO | WO 01/09230 | 2/2001 |
| WO | WO 01/23189 | 4/2001 |
| WO | WO 02/081097 | 10/2002 |
| WO | WO 2006/087967 | 8/2006 |
| WO | WO 2007/011050 | 1/2007 |
| WO | WO 2007/011054 | 1/2007 |
| WO | WO 2008/102140 | 8/2008 |
| WO | WO 2012/175417 | 12/2012 |

OTHER PUBLICATIONS

Arora et al., "Battery Separators", Chem. Rev., 2004, 104(10), 4419-4462.

Mulholland, "Lasermarkable Engineering Resins", Ticona Performance Driven Solutions; 2009; 6 pages.

Srinivasan et al., "Ultraviolet Laser Ablation of Organic Polymers", Chem. Rev. 1989, 89(6), 1303-1316.

Yung et al., "A Study of the Heat-Affected Zone in the UV YAG Laser Drilling of GFRP materials", Journal of Materials Processing Technology, 2002, 122(2-3), 278-285.

LASER-PERFORATED POROUS SOLID-STATE FILMS AND APPLICATIONS THEREOF

CROSS REFERENCE TO RELATED PATENT APPLICATION

This application claims priority to U.S. Patent Application No. 61/751,057 filed Jan. 10, 2013, hereby incorporated herein by reference in its entirety.

BACKGROUND

The laser perforation technique (e.g., system(s), device(s), process(es), etc.) can satisfy various requirements of porous films as put forward in various industries. For instance, the disclosed laser perforation technique can provide control of pore dimensions and/or distributions with ease of implementation, controlled speed of formation, and substantive process integrity.

The laser perforation technique has been used previously to prepare thin, porous films with a well-controlled porous morphology. For example, U.S. Pat. No. 7,083,837 describes the use of the laser perforation technique using a $CO_2$ laser to prepare packaging films. The controlled pore morphology allows to tune the oxygen transmission rate (OTR), moisture vapor transmission rate (MVTR) and the $CO_2$ transmission rate ($CO_2$TR). The targeted pore sizes are in the range of 110 to 400 micrometers. In another example, DE 19647543 describes the use of the laser perforation technique to prepare packaging films with non-spherical holes, which deform as a function of the applied stress. Another example, EP 0953399, shows that the same laser perforation method can be used to create perforated films with an even larger pore size of up to 5000 micrometers. In another example, JP 10330521, the laser perforation technique is used to perforate 10-120 micrometer holes in polyolefines, which comprise a high liquid (paraffinic) retention. U.S. Pat. Appl. Pub. No. 2003/0188428A1 provides examples of the application of removable films for the manufacturing of circuit boards through the laser perforation technique by using a third harmonics YAG solid-state laser with short wavelengths. Laser perforation has also been used to produce filtration membranes, for example, as described in WO1998030317A1, or drug delivery membranes, as described in WO2002081097A1 or, after filling the pores with a polymer electrolyte or fibrous fillers, as solid polymer electrolyte membranes for fuel cells, as described in WO2007011050A1, WO2007011054A1, US20060065521A1, US20060183011A1, JP2004247123, JP2009045911 and JP2009051872. The latter describes the need of cooling the polymer film during laser perforation as to prevent the polymer film from melting or dripping. In another example, US Pat. Appl. Pub. No. 2012/0244412, the laser perforation technique is used to perforate thin polymeric or metallic films of less than 20 micrometer in thickness with pores of 50 to 250 micrometer by using $CO_2$ laser in combination with materials absorbing wavelengths in the near infra read region. After lamination of the perforated film with another porous medium, the laminate can be applied as a battery separator. JP2001319635 describes the use of a laser perforation method to perforate polyolefin films (such as polyethylene or polypropylene) of 5-30 micron in thickness. These perforated films are then combined with a fibrous polyolefin layer and applied as a battery separator. The laser perforation method and the resulting pore sizes are not described. CN101552328 describes the laser perforation of polypropylene/polyethylene/polypropylene tri-layer films, resulting in 50-400 micron large pores and a total void content of 40% or higher. Laser perforation can also be used to perforate materials other than thermoplastic polymers. For example, inorganic materials can be perforated, as e.g. described in US 2011/0262693, where an excimer laser and near-field imaging is used to laser-perforate silica films. Also, stretchable, elastomeric materials can be laser-perforated with pores of about 50 micron, as e.g. described in U.S. Pat. No. 5,336,554. WO 2008/102140 provides an example of how a laser perforation method can be applied in a continuous, on-line fashion to perforate films, although the obtained structures and properties of the films are not disclosed.

Although the use of laser perforation has been demonstrated to be useful for the preparation of well-controlled, porous morphologies in polymeric and inorganic films, there exists a need to perforate thin, polymeric films with pores that are substantially smaller than 50 micrometer in order to assure the physical separation of electrodes in energy storage devices such as batteries, electrolytic capacitors and fuel cells.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

The disclosure relates, in one aspect, to porous solid-state films with controlled pore structures obtained by laser perforation. The disclosed solid-state films having controlled pore morphology can be applied as porous films in a variety of functional environments (either aqueous or non-aqueous) in which permeability to specific elements (e.g., ions of specific sizes; compounds of specific sizes; such as drugs or nanoparticles; etc.) is to be regulated or permitted under specific operational conditions. In an example application, the solid-state porous films can be used as separator films in electrolytic energy storage systems, such as batteries and supercapacitors. The solid-state porous films can be combined with other porous films to form a stacked system combining the permeation properties of the individual components. In an example application, the porous films produced via laser perforation based on high temperature polymers can be combined with other porous films based on low temperature polymers, thereby providing battery separator films having a suitable shutdown mechanism and including a high temperature melt integrity layer that does not restrict ionic conduction through the total film.

The laser perforation technique (e.g., system(s), device(s), process(es), etc.) can satisfy various requirements of porous films as put forward in various industries. For instance, the disclosed laser perforation technique can provide control of pore dimensions and/or distributions with ease of implementation, controlled speed of formation, and substantive process integrity.

Although the use of laser perforation has been demonstrated to be useful for the preparation of well-controlled, porous morphologies in polymeric and inorganic films, there exists a need to perforate thin, polymeric films with pores that are substantially smaller than 50 micrometer in order to assure the physical separation of electrodes in energy storage devices such as batteries, electrolytic capacitors and fuel cells. The pore structure needs to be well controllable in terms of pore size, pore size distribution and pore location. The substrate should not be damaged by the pore formation, e.g. by melting or dripping. The perforated film should have a high temperature melt integrity (HTMI) of 180° C., or higher, for example, to improve the dimensional stability at high temperature and, therefore, the safety of the energy storage device.

Film perforation can be performed with a variety of lasers. The minimal size or resolution of the perforated geometries is proportional to the wavelength of the laser used. Therefore, $CO_2$ (10.6 μm) or Nd:YAG (1064 nm) lasers are less preferred to perforate films when small pore sizes are desired. Infrared lasers, such as a Nd:YAG (1064 nm) laser, are likely to lead to a heat-affected zone (HAZ), that is formed around the laser-drilled hole (reference K. C. Yung, S. M. Mei, T. M. Yue, Journal of Materials Processing Technology (2002), Volume 122, Issues 2-3, Pages 278-285). This is because the material-removal mechanism with infrared lasers is a thermal mechanism (melting, evaporation, or vaporization). One approach to reduce such thermal effects is to use UV lasers in the perforation of holes. The high energy UV photons can directly atomize the surface material in a process known as photo-ablation, which is associated with a photochemical mechanism rather than with a photo-thermal mechanism. (reference R. Srinivasan, B. Braren, Chem. Rev. 89 (6) (1989) 1303-1316).

It is known that multiple parameters influence the final structure of a laser-perforated polymer film. As described in e.g. R. Srinivasan, B. Braren, Chem. Rev. 89 (6) (1989) 1303-1316, the fluence at the surface (expressed e.g. in $mJ/cm^2$, mainly determined by pulse energy and size of the laser beam hitting the surface) has a significant impact on the depth of etching with each laser pulse hitting the surface of the film. The fluence at the surface is a parameter controlled by the settings of the laser device. However, absorption of the laser energy by the film material is crucial to create well-defined pore structures, for example as demonstrated in co-pending patent application Ser. No. 13/909,378, which shows that for a material to be modified by a laser (e.g. laser marking, or laser perforation), the material needs to absorb at least part of the light at the wavelength of the laser. Moderate or weak absorption at the laser wavelength will require a significantly higher fluence to etch the material, by which the material-removal mechanism shifts from a photochemical mechanism to a photo-thermal mechanism, which will lead to a loss of control on the pore structure (etch depth, pore diameter, pore location, etc.) and significantly more thermal damage to the substrate. It is, therefore, of importance to the current invention to laser-perforate films based on polymers that readily absorb at the wavelength of the UV laser, e.g. a light absorbance of 60% or higher.

In one aspect, the disclosure provides a thin film with a high temperature melt integrity (HTMI) equal to or exceeding 180° C. comprising a slab defining a plurality of pores distributed in a predetermined arrangement, wherein the plurality of pores can have a distribution of sizes bound by a predetermined magnitude. In addition, the slab can have a thickness of at most 100 μm, and each pore of the plurality of pores can be an open pore that pierces through the slab. In another aspect, the disclosure provides a device comprising a low melting polyolefinic (e.g. polyethylene) porous thin film, and a slab with a high temperature melt integrity equal to or exceeding 180° C. arranged in proximity of the low melting polyolefinic (e.g. polyethylene) porous thin film and defining a plurality of pores distributed in a predetermined arrangement, the plurality of pores having a distribution of sizes bound by a predetermined magnitude. The slab can have a thickness of at most 100 μm, and each pore of the plurality of pores can be an open pore that pierces through the slab.

Additional aspects, features, or advantages of the subject disclosure will be set forth in part in the description which follows and annexed drawings, and in part will be apparent from such description and drawings, or may be learned by practice of the subject disclosure. The advantages of the disclosure can be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The accompanying drawings are incorporated and illustrate exemplary embodiment(s) of the disclosure and together with the description and claims appended hereto serve to explain various principles, features, or aspects of the subject disclosure.

DETAILED DESCRIPTION

Figure 1:
FIG. 1 illustrates a typical structure of Celgard 2500 separator produced via dry extrusion process.
Figure 2:
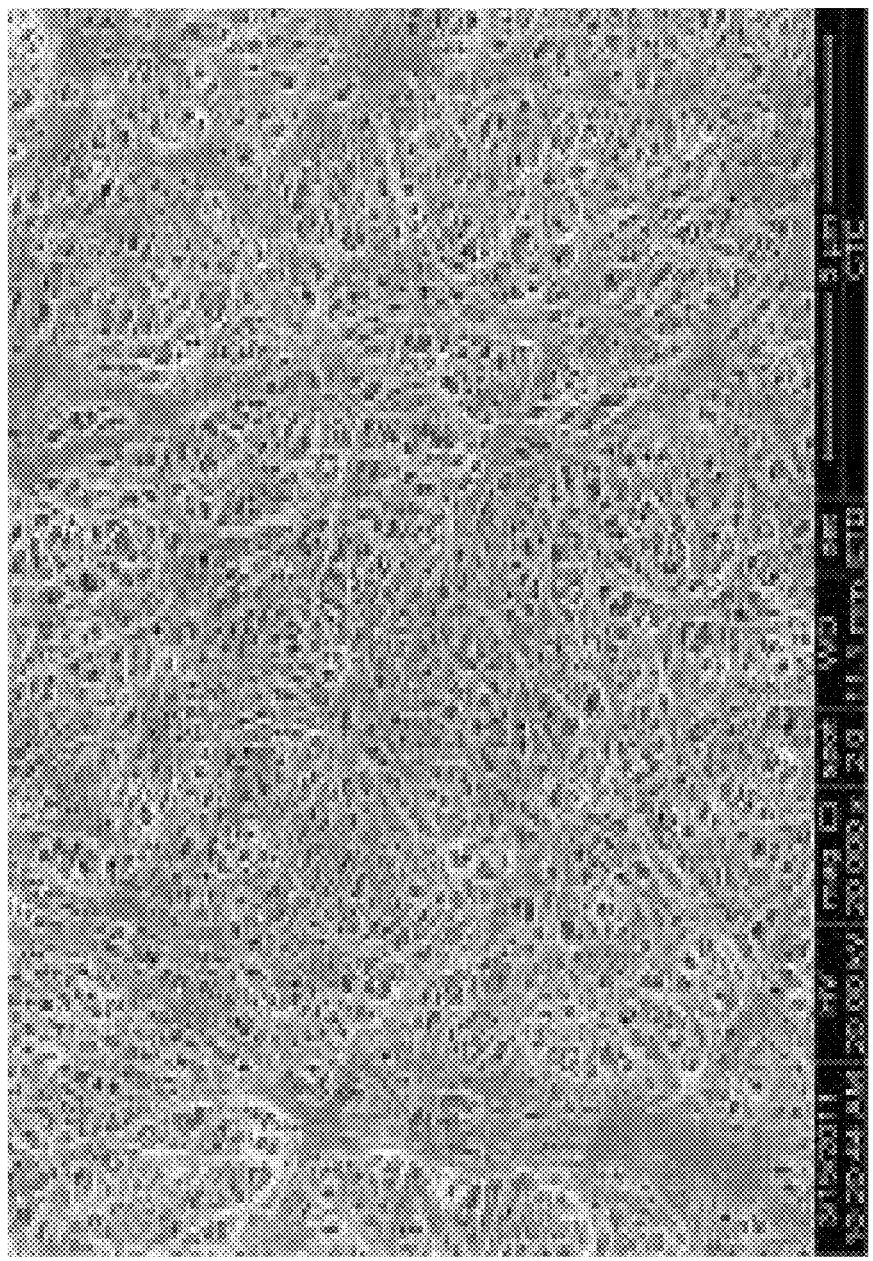
FIG. 2 illustrates a typical structure of Tonen V25CGD separator produced via wet process.

The subject disclosure may be understood more readily by reference to the following detailed description of exemplary embodiments of the subject disclosure and to the Figures and their previous and following description.

Before the present materials, compounds, compositions, articles, devices, and/or methods are disclosed and described, it is to be understood that the subject disclosure is not limited to specific coating materials, slabs, thin films, or the like, and surface shaping processes for absorption of electromagnetic radiation having gigahertz frequencies. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In the subject specification and in the claims which follow, reference may be made to a number of terms which shall be defined to have the following meanings: "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Throughout the description and claims of this specification, the word "slab" can comprise a film, woven material, non-woven material, solvent casted film, paper, solid or porous film, and is not intended to exclude, for example, other material sheets (extruded or otherwise).

Reference will now be made in detail to the various embodiment(s), aspects, and features of the subject disclosure, example(s) of which are illustrated in the accompanying drawings. Wherever possible, the same reference numbers are used throughout the drawings to refer to the same or like parts.

As described in greater detail below, in various aspects, the disclosure relates to control of pore structure—e.g., porosity, pore size, and/or pore distribution—in thin solid-state films and applications of such films. In general, the demand for materials with holes or pores having uniform dimensions and narrow distributions has grown significantly in recent times. The market(s) and application(s) can be diverse and include pharmaceutical, medical device, and beverage industries. In energy storage applications, in lithium-ion batteries and electrolytic capacitors, polymeric separator films can be based on polyethylene and/or polypropylene. Manufacturing methods of the current state-of-the-art battery separators are described e.g. in reference P. Arora, Z. Zhang, Chem. Rev. (2004), 104, 4419-4462. The porosity typically is induced by uniaxial stretching of extruded films, which is a process commonly known as the "dry process" and is based at least on a complex interplay between extrusion, annealing, and stretching of the film. The dry process typically leads to an open pore structure and a relatively uniform pore size. However, inherent to the stretching process, the dry process leads to non-spherical pores and to residual stresses in the material. Such stresses can lead to deformation (e.g., shrinkage) of the films over time, especially at elevated temperatures. Since crystallization/crystallinity is required during the stretching process in order to develop a porous structure, the preparation of porous films by the dry process is limited to semi-crystalline polymers only. Although this process allows for a reasonably high porosity (from about 30 to about 50%), the actual accessible porosity (as measured by air permeability, for example) can be often significantly lower because not all pores are accessible or mutually interconnected.

Alternatively or additionally, porosity can be induced by pre-mixing the polymer with a low molecular weight extractable, which can form a specific structure upon cooling from the melt and, after removal of the low molecular weight species, yields a porous structure. Such process generally is referred to as the "wet process," and typically utilizes a polymer/extractable combination that can be miscible during the extrusion process, but phase separates in response to cooling. In certain embodiments, the low molecular weight specie can be removed by evaporation or extraction. An additional stretching (e.g., uniaxial or biaxial) step can be implemented to create an intended pore structure. The wet process can lead to a highly tortuous, interconnected porous structure. The preparation of porous films by the wet process can be limited to polymers with relatively high melt strength (e.g., ultra-high molecular weight polyethylene). It should be appreciated that the actual accessible porosity (as measured by air permeability, for example) can be often significantly lower than the total porosity because not all pores are accessible or mutually interconnected.

Without wishing to be bound by theory, simulation, and/or modeling, high porosity of separator films can be beneficial for the charging and discharging characteristics of batteries because the volume resistivity of the cell typically scales inversely with the accessible separator porosity. Generally, separator pore sizes preferably are smaller than the particle size of the anode and cathode active materials, such size ranging from about 1 μm to about 5 μm. In addition or in the alternative, pore size distribution preferably is narrow, and the pores preferably are uniformly distributed. It is to be understood by experts in the field that non-uniform pore distribution of a separator film will lead to non-uniform ionic flow through the separator, which, eventually, will facilitate lithium dendritic growth and, consequently, the possibility of forming a short-circuit in the battery cell. In one aspect, a substantive portion of all pores or substantially all pores are preferably connected from a front surface of the porous film to a back surface of the film. Stated similarly, the actual accessible porosity preferably equals the total porosity of the film. Accordingly, substantially all pores can be accessible to the electrolyte solution and can contribute to ion transport through the separator. In the case of Li-ion batteries, and without wishing to be bound by theory, simulation, and/or modeling, high tortuosity and an interconnected pore structure can be beneficial for long life batteries because it can suppress growth of lithium crystals on the graphite anode during fast charging or low temperature charging. In the alternative, an open (e.g., low tortuosity) and substantially uniform pore size structure can be beneficial for applications where fast charging and discharging may be required, e.g., in high power density batteries, and electrolytic ultracapacitors.

Capacitors which store the energy within the electrochemical double-layer at the electrode:electrolyte interface are known under various names which are trademarks or established colloquial names such as 'doublelayer capacitors', 'supercapacitors', 'ultracapacitors', 'power capacitors', 'gold capacitors' or 'power cache'. 'Electrochemical double-layer capacitor' is the name that describes the fundamental charge storage principle of such capacitors. However, additional contributions can affect the capacitance other than double layer effects. Use of high surface-area electrodes result in extremely large capacitance. The films, compositions, and methods of the present disclosure can be implemented with ultracapacitors.

In application scenario, the laser perforation technique of the disclosure can provide nearly ideal separator films that can combine a thermal shutdown mechanism with high temperature melt integrity (HTMI). The shutdown mechanism can be based on melting of a porous polyethylene (PE) film at about 100° C., which in the case of an undesired temperature increase above about 100° C. can close irreversibly the pores and stop ionic flow, thereby reducing temperature and preventing a thermal runaway scenario. It should be appreciated that HTMI of the separator can be desirable in order to prevent the separator film from deforming at elevated temperatures, as deformation may lead to direct electrode contact and shorting. In one aspect, HTMI typically is required up to temperatures of 180° C. because even when a shutdown mechanism is present, closing of the pores is not instantaneous. Conventional polypropylene/polyethylene based separators generally do not fulfill such HTMI requirement.

With the laser perforation technique of the disclosure, porous films with well-controlled pore characteristics can be prepared via laser perforation (or laser drilling) of thin polymer films. In one embodiment, by applying short laser pulses on a predetermined position (e.g., computer-controlled position) on a polymer film, a portion of the polymer film can be melted and/or removed due to local absorption of the energy transported by the laser, thus forming a pore. In one aspect, as the position of the laser pulse is fully computer-controlled, the technique can permit substantive control of the total porosity and pore distribution. For example, the size of the pores can be controlled in at least two ways: (a) by modulating the laser parameters, including laser pulse power (the amount of work, e.g. energy of photons, done per second), laser pulse energy (the mean pulse power multiplied by the pulse duration), laser pulse frequency (number of laser pulses per second), power density (the power per unit area, depends on how the laser is focused with respect to the polymeric film), laser fundamental wavelength (the distance between two peaks of an electromagnetic wave of the laser source), pulse duration (the interaction time between each laser pulse and the substrate at a single, pre-defined location), and (b) by manipulating the laser-matter interaction by using precursor materials with inherent different extents of light absorption at a certain laser wavelength, by changing the laser fundamental wavelength, or by adding absorbing dopant(s) to the nominally non-porous polymer material utilized as a precursor material.

In one aspect, the described laser perforation technique (e.g., system(s), device(s), process(es), combinations thereof, or the like) can provide a fast, direct method to prepare porous films with a substantive control of pore morphology (e.g., size, distribution, uniformity, etc.). Such technique does not rely on polymer crystallinity, melt strength, and/or solubility, and can therefore extend beyond the traditional polymers utilized to prepare porous films, e.g., via the dry process and the wet process. In certain scenarios, the disclosed technique can permit formation of controlled porous structures of multi-layered films (e.g., in monolithic structures or loosely-coupled structures). In other scenarios, the disclosed technique can be utilized in a nearly continuous production process, such as in on-line laser perforation of extruded films. Potential applications can comprise separator films for batteries based on various electrochemistries, including lithium-ion batteries, and separator films for (ultra)capacitors.

The present disclosure comprises at least the following embodiments.

Embodiment 1

A thin laser-perforated film, comprising: a slab defining a plurality of pores distributed in a predetermined arrangement, the plurality of pores having a distribution of sizes bound by a predetermined magnitude, the slab having a thickness of at most 100 µm, and each pore of the plurality of pores piercing through the slab.

Embodiment 2

The thin film of embodiment 1, wherein the slab has a high temperature melt integrity (HTMI) equal to or exceeding about 180° C.

Embodiment 3

The thin film of any of embodiments 1, wherein the slab is formed from a polymer or polymeric material.

Embodiment 4

The thin film of embodiment 3, wherein the polymer comprises one or more of polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or a copolymer or blend thereof.

Embodiment 5

The thin film of any of embodiments 1-4, wherein the slab is formed from a non-polymer material.

Embodiment 6

The thin film of any of embodiments 1-5, wherein each of the plurality of pores is formed via laser perforation or laser drilling.

Embodiment 7

The thin film of any of embodiments 1-6, wherein each of the plurality of pores is formed via laser perforation of the slab or laser drilling of the slab, a surface of the slab being coupled to a mask transparent to electromagnetic radiation emitted from a laser that enables the laser perforation.

Embodiment 8

The thin film of embodiment 7, wherein the surface of the slab coupled to the mask is exposed to the electromagnetic radiation through the mask.

Embodiment 9

The thin film of any of embodiments 1-8, wherein the slab is formed from a material containing at least one component that absorbs electromagnetic radiation having wavelengths below about 2000 nm.

Embodiment 10

The thin film of any of embodiments 1-8, wherein the slab is formed from a material containing at least one component that absorbs electromagnetic radiation having wavelengths below about 1000 nm.

Embodiment 11

The thin film of any of embodiments 1-9, wherein the slab is formed from a material containing at least one component that absorbs electromagnetic radiation in the UV portion of the electromagnetic spectrum.

Embodiment 12

The thin film of any of embodiments 1-10, wherein a laser that enables the laser perforation emits radiation having wavelengths below about 1000 nm.

Embodiment 13

The thin film of any of embodiments 9, wherein the predetermined magnitude is determined at least in part by one or more operational parameters of the laser, the one or more operational parameters comprising one or more of laser pulse power (the amount of work, e.g. energy of photons, done per second), laser pulse energy (the mean pulse power multiplied by the pulse duration), laser pulse frequency (number of laser pulses per second), power density (the power per unit area, depends a.o. on how the laser is focused with respect to the polymeric film), laser fundamental wavelength (the distance between two peaks of an electromagnetic wave of the laser source), pulse duration (the interaction time between each laser pulse and the substrate at a single, pre-defined location).

Embodiment 14

The thin film of any of embodiments 1-13, wherein the predetermined magnitude is determined at least in part by a composition of a material forming the slab.

Embodiment 15

The thin film of any of embodiments 1-14, wherein the pores have a mean diameter ranging from 0.1 micrometer up to about 50 micrometer Embodiment 16

The thin film of any of embodiments 1-15, wherein the slab has a total hole area of 10 to 80%

Embodiment 17

A thin film, comprising: a first slab of a first material, the first slab having a plurality of pores distributed in a predetermined arrangement, the plurality of pores having a distribution of sizes bound by a predetermined magnitude; and a second slab of a second material, the second slab coupled to the first slab and having the plurality of pores distributed in substantially the predetermined arrangement, the first slab and the second slab having a combined thickness of at most 100 μm, and each pore of the plurality of pores piercing through the first slab and the second slab.

Embodiment 18

The thin film of embodiment 16, wherein one or more of the first slab and the second slab is formed from a polymer or polymeric material.

Embodiment 19

The thin film of embodiment 17, wherein the polymer comprises one or more of polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polymethylpentene, polyimide, polyketone, polyetherketone, polyetheretherketone, polyphenylene sulfide, or a copolymer or blend thereof.

Embodiment 20

The thin film of any of embodiments 17-19, wherein one or more of the first slab and the second slab is formed from a non-polymer material.

Embodiment 21

The thin film of any of embodiments 17-20, wherein each of the plurality of pores is formed via laser perforation or laser drilling.

Embodiment 22

The thin film of any of embodiments 17-21, wherein each of the plurality of pores is formed via laser perforation of the one or more of the first slab and the second slab or laser drilling of the one or more of the first slab and the second slab, a surface of the one or more of the first slab and the second slab being coupled to a mask transparent to electromagnetic radiation emitted from a laser that enables the laser perforation.

Embodiment 23

The thin film of embodiment 22, wherein the surface of the one or more of the first slab and the second slab coupled to the mask is exposed to the electromagnetic radiation through the mask.

Embodiment 24

The thin film of any of embodiments 17-23, wherein the one or more of the first slab and the second slab is formed from a material that absorbs electromagnetic radiation in the ultraviolet (UV) portion of the electromagnetic spectrum.

Embodiment 25

The thin film of any of embodiments 17-24, wherein the one or more of the first slab and the second slab is formed from a material containing at least one component that absorbs electromagnetic radiation in the UV portion of the electromagnetic spectrum.

Embodiment 26

The thin film of any of embodiments 17-25, wherein a laser that enables the laser perforation emits radiation having wavelengths in the UV portion of the electromagnetic spectrum.

Embodiment 27

The thin film of any of embodiments 16-25, wherein the predetermined magnitude is determined at least in part by one or more operational parameters of the laser, the one or more operational parameters comprising one or more of laser speed, laser power, laser frequency, laser focus condition, or laser fill factor.

Embodiment 28

The thin film of any of embodiments 17-27, wherein the predetermined magnitude is determined at least in part by a composition of a material forming the one or more of the first slab and the second slab.

Embodiment 29

The thin film of any of embodiments 17-28, wherein the distribution of sizes has sizes ranging from about 1 μm to about 200 μm.

Embodiment 30

The thin film of any of embodiments 17-29, wherein the distribution of sizes has sizes ranging from about 16 μm to about 24 μm.

Embodiment 31

The thin film of any of embodiments 17-29, wherein the distribution of sizes has sizes ranging from about 30 μm to about 35 μm.

Embodiment 32

The thin film of any of embodiments 17-29, wherein the distribution of sizes has sizes ranging from about 31 μm to about 37 μm.

Embodiment 33

The thin film of any of embodiments 17-29, wherein the distribution of sizes has sizes ranging from about 34 μm to about 38 μm.

Embodiment 34

The thin film of any of embodiments 17-29, wherein the distribution of sizes has sizes ranging from about 41 μm to about 48 μm.

Embodiment 35

The thin film of any of embodiments 17-29, wherein the distribution of sizes has sizes ranging from about 56 μm to about 62 μm.

Embodiment 36

The thin film of any of embodiments 17-29, wherein the distribution of sizes has sizes ranging from about 57 μm to about 60 μm.

Embodiment 37

The thin film of any of embodiments 17-29, wherein the distribution of sizes has sizes ranging from about 66 μm to about 72 μm.

Embodiment 38

A method, comprising: providing a slab having a thickness of at most 100 μm; and removing material from the slab through a process effective to produce a plurality of pores in the slab, the plurality of pores being distributed in a predetermined arrangement and having a distribution of sizes bound by a predetermined magnitude, each pore of the plurality of pores piercing through the slab.

Embodiment 39

The method of embodiment 38, wherein the process comprises laser perforation.

Embodiment 40

The method of any of embodiments 38-39, wherein the process comprises configuring one or more operational parameters of a laser that enables the laser perforation, thereby controlling the predetermined magnitude.

Embodiment 41

The method of any of embodiments 38-40, wherein the process comprises configuring spatial distribution of intensity of electromagnetic radiation emitted by a laser that enables the laser perforation, thereby controlling at least one porous size of the distribution of sizes.

Embodiment 42

The method of any of embodiments 38-41, further comprising arranging the slab in proximity of a porous thin film.

Embodiment 43

The method of embodiment 42, wherein the porous thin film if formed from process that is different from the process used to form the porous slab.

Embodiment 44

The method of any of embodiments 38-43, further comprising providing a film arranged in proximity to the slab to form a multi-layered system, wherein removing material from the slab through a process effective to produce a plurality of pores in the slab comprises removing material from the film through a similar process effective to produce a plurality of pores in the film

Embodiment 45

A device, comprising: a polyethylene porous thin film; and a slab arranged in proximity of the polyethylene porous thin film and defining a plurality of pores distributed in a predetermined arrangement, the plurality of pores having a distribution of sizes bound by a predetermined magnitude, and the slab having a thickness of at most 100 micron, and each pore of the plurality of pores piercing through the slab.

Embodiment 46

The device of embodiment 45, wherein the polyethylene porous thin film melts at temperatures ranging from about 100° C. to about 130° C., thereby providing a shutdown mechanism for the device.

Embodiment 47

The device of any of embodiments 45-46, wherein the polyethylene porous thin film has a thickness of at least 5 microns.

Embodiment 48

The device of any of embodiments 45-47, wherein the polyethylene porous thin film and the slab form a substantially planar composite film exhibiting high temperature melt integrity (HTMI) at temperatures greater than about 180° C. and a shutdown mechanism at temperatures in between 100 and 130° C.

Embodiment 49

The device of any of embodiments 44-47, wherein the composite film is contained in a battery, thereby forming an HTMI battery separator.

Embodiment 50

The device of any of embodiments 45-49, wherein the composite film is contained in an electrolytic capacitor.

Embodiment 51

A perforated film comprising: a slab defining a plurality of pores distributed in a predetermined arrangement, the plurality of pores having a mean diameter less than about 50 μm; wherein the plurality of pores are formed in the slab with a laser having a wavelength less than about 400 nm and the slab has a transmission of the laser light of equal to or less than about 70% measured at a thickness of the slab of 100 micrometer or less; and wherein the slab has a high temperature melt integrity (HTMI) equal to or exceeding about 180° C.

Embodiment 52

The perforated film of embodiment 51, wherein the transmission of the laser light is measured according to ASTM D1003-00, Procedure A, using D65 illumination, 10 degrees observer.

Embodiment 53

The perforated film of embodiment 51, wherein the slab is formed from a polymer comprising one or more of polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or a copolymer and/or blend thereof.

Embodiment 54

The perforated film of embodiment 53, wherein the polymer comprises an ultraviolet absorbing additive selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, or combinations comprising at least one of the foregoing.

Embodiment 55

The perforated film of embodiment 51, wherein each of the plurality of pores is formed via laser perforation or laser drilling.

Embodiment 56

The perforated film of embodiment 51, wherein each of the plurality of pores is formed via laser perforation of the slab or laser drilling of the slab, a surface of the slab being coupled to a mask, where the mask is locally transparent to electromagnetic radiation emitted from a laser in a pre-defined manner that enables laser perforation of the slab through the areas of the mask that are substantially transparent to the electromagnetic radiation.

Embodiment 57

The perforated film of embodiment 51, wherein the slab is formed from a material containing at least one polymeric component that absorbs electromagnetic radiation having wavelengths below about 2000 nm.

Embodiment 58

The perforated film of embodiment 51, wherein the slab is formed from a material containing at least one component that absorbs electromagnetic radiation having wavelengths below about 1000 nm.

Embodiment 59

The perforated film of embodiment 51, wherein the slab has a total hole area of 10 to 80%.

Embodiment 60

The perforated film of embodiment 51, wherein the slab comprises a plurality of material layers.

Embodiment 61

The perforated film of embodiment 51, wherein the slab is integrated as high temperature separator for lithium ion battery or a separator for an electrolytic supercapacitor or a support membrane for a fuel cell membrane.

Embodiment 62

A method, comprising: providing a slab having a high temperature melt integrity (HTMI) equal to or exceeding about 180° C.; and removing material from the slab by exposing the slab to a laser having a wavelength less than about 400 nm to produce a plurality of pores in the slab, the plurality of pores having a mean diameter less than about 50 μm and the slab having a transmission of the laser of equal to or less than about 70% measured at a thickness of the slab of 100 micrometer or less.

Embodiment 63

The method of embodiment 62, wherein the transmission of the laser light is measured according to ASTM D1003-00, Procedure A, using D65 illumination, 10 degrees observer.

Embodiment 64

The method of embodiment 62, further comprising arranging the slab in proximity of a porous thin film.

Embodiment 65

The method of embodiment 64, wherein the porous thin film if formed from a process that is different from the process used to form the porous slab.

Embodiment 66

The method of embodiment 64, wherein the porous thin film comprises a polymer selected from polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or a copolymer and/or blend thereof.

Embodiment 67

The method of embodiment 66, wherein the polymer comprises one or more ultraviolet absorbing additives selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, or combinations comprising at least one of the foregoing.

Embodiment 68

A composite film comprising: a porous thin film; and a slab arranged in proximity of the porous thin film and defining a plurality of pores distributed in a predetermined arrangement, the plurality of pores having a mean diameter less than about 50 μm; wherein the slab has a high temperature melt integrity (HTMI) equal to or exceeding about 180° C. and the slab having a transmission of the laser of equal to or less than about 70% measured at a thickness of the slab of about 100 micrometer or less.

Embodiment 69

The composite film of embodiment 68, wherein the transmission of the laser light is measured according to ASTM D1003-00, Procedure A, using D65 illumination, 10 degrees observer.

Embodiment 70

The composite film of embodiment 68, wherein the porous thin film is based on polyethylene and melts at temperatures ranging from about 100° C. to about 130° C., thereby providing a shutdown mechanism.

Embodiment 71

The composite film of embodiment 68, wherein the polyethylene porous thin film has a thickness of at least 5 microns.

Embodiment 72

The composite film of embodiment 68, wherein the composite film is contained in a battery, thereby forming an HTMI battery separator.

Embodiment 73

The composite film of embodiment 68, wherein the composite film is contained in an electrolytic capacitor as a separator.

Embodiment 74

The composite film of embodiment 68, wherein the composite film is contained in a fuel cell as a support membrane.

In an aspect, transmission data was acquired on an X-rite 1-7 spectrophotometer in the range 360 nm to 750 nm according to ASTM D1003-00 using D65 illumination and 10 degrees observer. The thickness of the films is given in Table A and the transmission percent is measured at about 360 nm.

TABLE A

| Sample | Film thickness (micron) | Chemical composition | % Light transmission at 360 nm |
|---|---|---|---|
| Lexan ™* 112 | 50 | BPA Polycarbonate with 0.1 wt % UV absorber | 61 |
| Lexan ™ 112 | 100 | BPA Polycarbonate with 0.1 wt % UV absorber | 48 |
| Lexan ™ | 150 | BPA Polycarbonate | 91 |
| Ultem ™* 1000 | 25 | Polyetherimide | 1 |
| Ultem ™ 1000 | 50 | Polyetherimide | 1 |
| Kapton | 50 | Polyimide | 0 |
| Siltem ™*/ PEEK (50/50) | 25 | Blend of 50 wt % poly(etherimidesiloxane) copolymer and 50 wt % polyetheretherketone | 1 |
| Ultem ™ CRS 5001 | 25 | Polyetherimide | 1 |
| Ultem ™ CRS 5001 | 15 | Polyetherimide | 3 |
| PMMA | 75 | Polymethylmethacrylate | 2 |
| PEN | 100 | Polyethylenenaphthalate | 2 |
| PET | 175 | Polyethyleneterephthalate | 71 |
| Aurum | 100 | Thermoplastic polyimide | 1 |
| PEEK | 150 | Polyetheretherketone | 1 |
| EXL1433T | 50 | Blend of 42 wt % BPA polycarbonate with 58 wt % poly(carbonate-siloxane) copolymer (3.5% siloxane) | 30 |

*Lexan, Ultem, Siltem are trademarks of SABIC Innovative Plastics.

Figure 3:
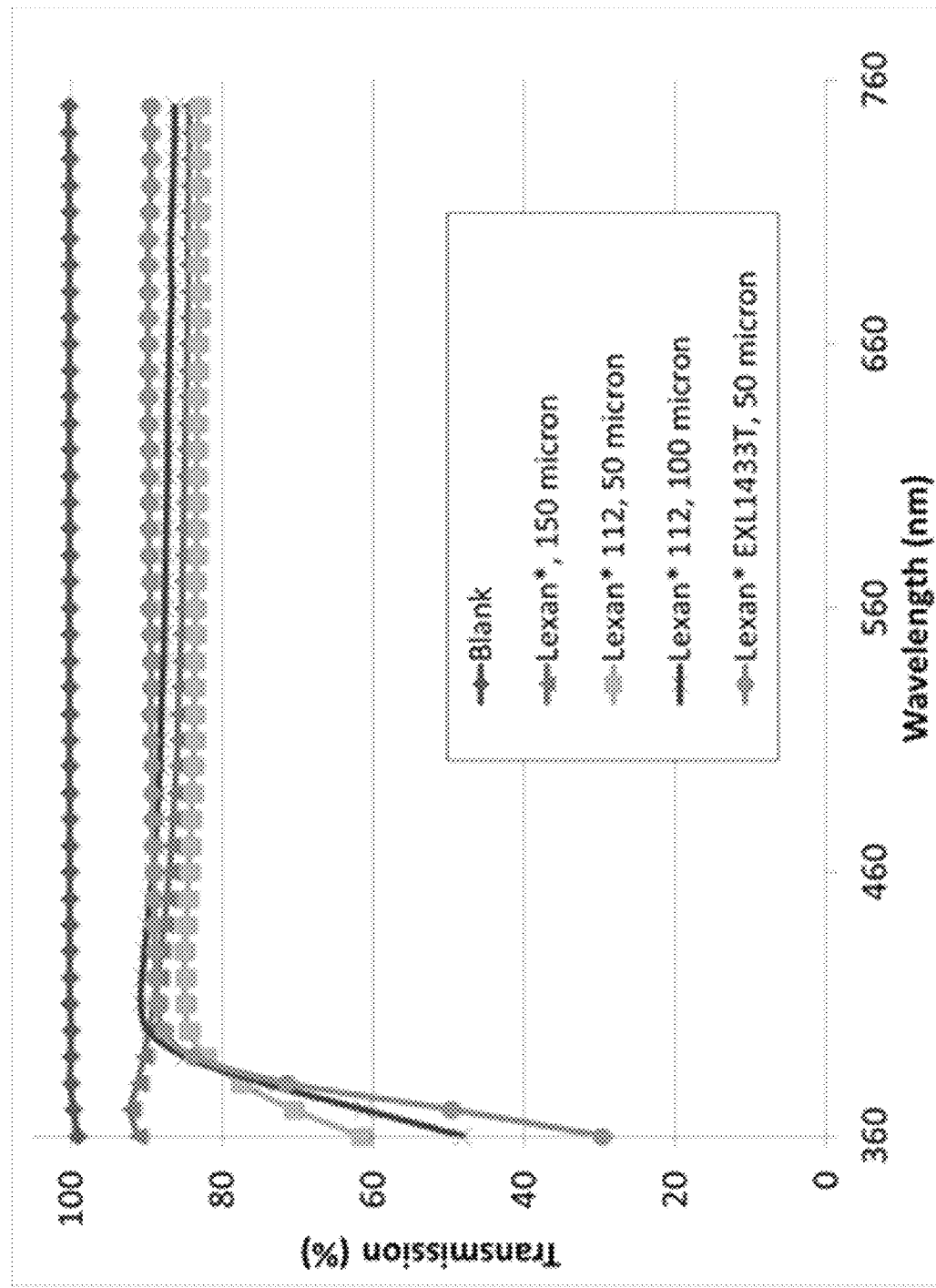
FIG. 3 illustrates transmission curves of thin polycarbonate films.

FIG. 3 shows the absence of significant light absorption at wavelengths <400 nm for Lexan™, even at a high thickness of 150 micron. FIG. 3 also shows that by adding 0.1 wt % of a standard UV absorber, the light absorption at wavelengths <400 nm increases significantly. To one skilled in the art, it is clear that by increasing the amount of UV absorbed, the extent of UV light absorption can be controlled and increased to enable laser perforation of Lexan™ (or other polymers with limited intrinsic light absorption in the UV range) through the use of a UV laser. FIG. 3 also shows that the extent of light absorption can be controlled by using blends and/or co-polymers of Lexan™*, such as for example a blend of 42 wt % BPA polycarbonate and 58 wt % poly(carbonate-siloxane) block copolymer, and that for such blends and/or copolymer the light absorption at wavelengths <400 nm increases significantly.

Figure 4:
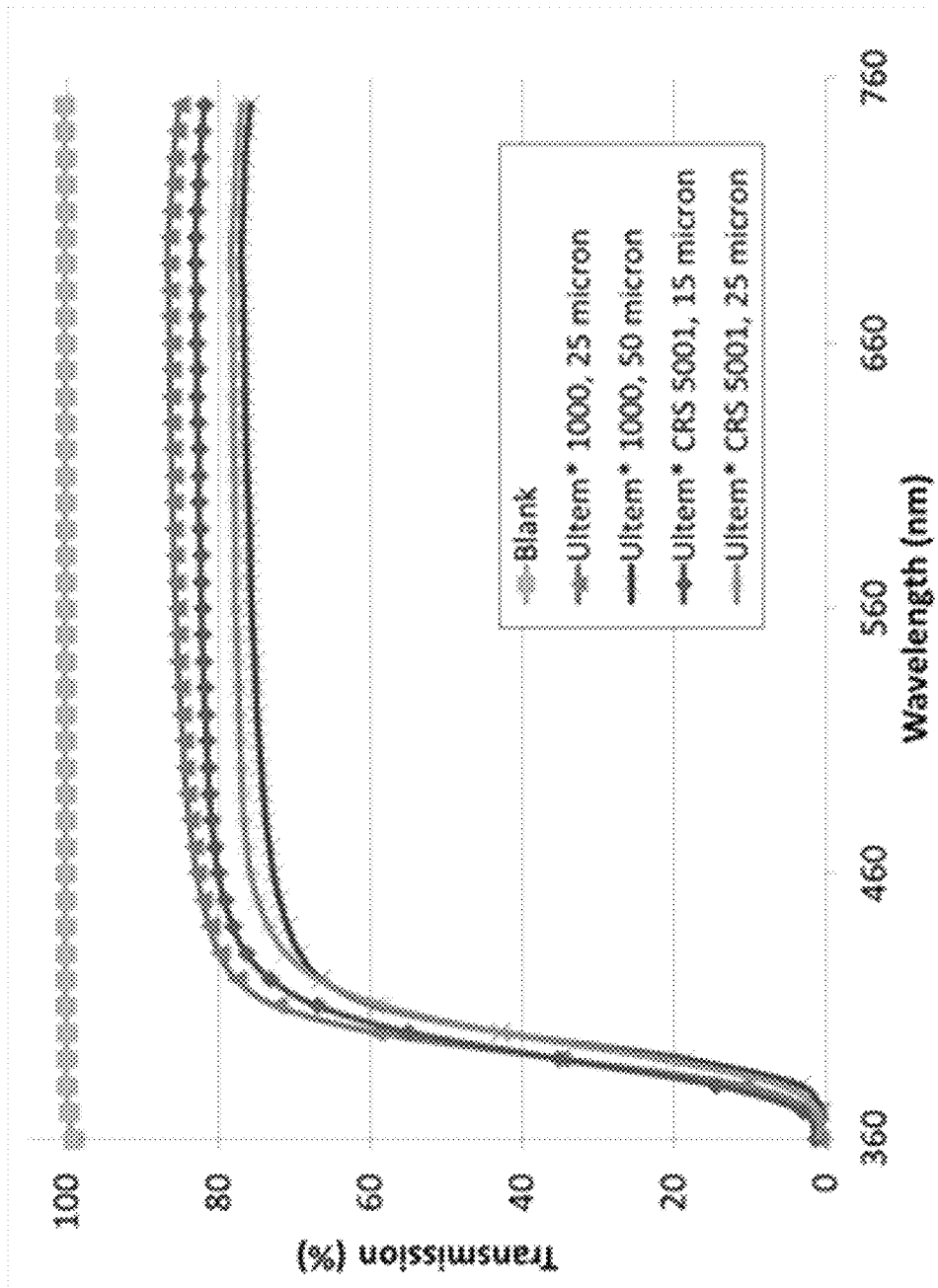
FIG. 4 illustrates transmission curves of thin polyetherimide films.

FIG. 4 shows UV light absorption of polyetherimides, for example, the light transmission at 360 nm is close to 0%, even for ultra-thin films of 15 micron, which make these materials exceptionally suitable for laser perforation with UV lasers.

Figure 5:
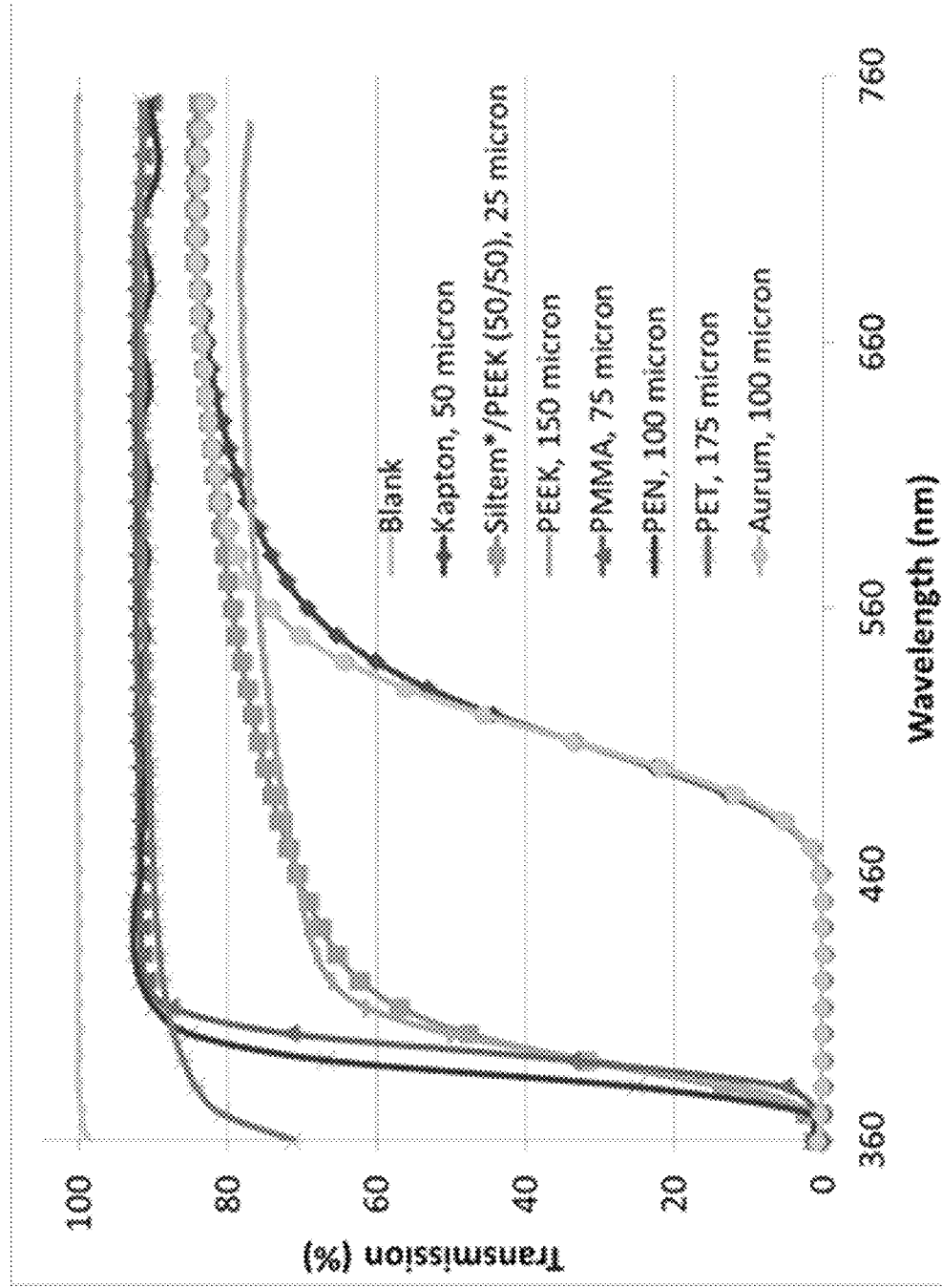
FIG. 5 illustrates transmission curves of thin polymer films.

FIG. 5 shows the light transmission curves of other polymer films, from which it is evident that small changes in chemical structure significantly change the light absorption in the UV range. For example, 100 micron thick PEN films transmit only 2% of the light at 360 nm, while PET films transmit as much as 71% of the light at 360 nm, even though the thickness is significantly higher (175 micron). Both Aurum and Kapton show a very strong light absorption in the UV range, but also PMMA and PEEK absorb strongly in the UV range. FIG. 5 shows that polymer blends, such as for example Siltem™/PEEK, can also absorb strongly in the UV range, which enables to laser perforate such blends with a UV laser.

TABLE I

Example operational features of an example solid-state laser (Trumpf TruMark 6330) utilized for laser perforation of a polyetherimide film in accordance with one or more aspects of the disclosure.

| Laser type | TruMark 6330 |
|---|---|
| Wavelength | 355 nm |
| Frequency | 20-120 kHz |
| Spot size | 25.0 micron |

TABLE II

Example operational features of an example solid-state laser (Trumpf TruMicro 5350) utilized for laser perforation of a polyetherimide film in accordance with one or more aspects of the disclosure.

| Laser type | TruMark 5350 |
|---|---|
| Wavelength | 343 nm |
| Frequency | 400 kHz |
| Spot size | 6.3 micron |

TABLE III

Example operational conditions for laser perforation of several polymeric thin films using example operation features described in Table I and illustrative information indicative of respective pore morphology.

| LM conditions | Power (%) | speed (mm/sec) | Frequency (MHz) | Font size | Distance between holes (μm) | Size of holes (μm) |
|---|---|---|---|---|---|---|
| A | 50 | 200 | 30 | 0.5 | 180-190 | 37-43 |
| B | 60 | 200 | 20 | 0.5 | 160-170 | 66-72 |
| C | 60 | 800 | 20 | 0.5 | 180-190 | X |
| D | 60 | 400 | 20 | 0.5 | 175-185 | 16-24 |
| E | 65 | 300 | 20 | 0.5 | 170-180 | 56-62 |
| F | 55 | 200 | 20 | 0.25 | 50-55 | 41-48 |
| G | 50 | 200 | 20 | 0.25 | 50-55 | 30-35 |
| H | 60 | 300 | 20 | 0.25 | 50-55 | 31-37 |
| I | 60 | 300 | 20 | 0.25 | 95-100 | 34-38 |
| X | 60 | 200 | 20 | 0.25 | 85-90 | 57-60 |

* In one aspect, two spaces are introduced between the colon units for operational conditions I & J In one embodiment, an ultra-short pulsed, diode-pumped solid state laser from Trumpf Inc. of Farmington, Conn., can be utilized to perforate (or laser-drill holes) a polyetherimide film to produce a laser-perforated porous film. The fundamental wavelength of the solid state lasers is in the sub-400 nanometer range, i.e. the used laser is a UV laser. In one implementation, the polyetherimide film can have a thickness of at least about 10 μm. In another implementation, the polyetherimide film can have a thickness of at most about 100 μm. Example operational features of such lasers are summarized in Tables I-II. As described herein, various pore morphologies can be formed via the laser-drilling of the disclosure. In one scenario, a text image comprising a matrix of colons separated by one or two spaces can be formed in the polyetherimide film under various illustrative operational configurations as presented in Table III.

In one aspect, the porous structure of a laser-ablated (or laser-drilled) thin film, such as a polyetherimide film (e.g., Ultem™ 1000, 1010, XH6050, CRS 5001 or CRS 5011 film) can be analyzed by optical microscopy using an Olympus™ BX60 in transmission mode, and morphology of the pores (e.g., pore size, inter-pore distance, etc.) can be quantified using suitable software (e.g., the Olympus™ AnalySIS software) or firmware. As an example, the mean pore size of a perforated film can be determined by taking a microscopy image of the perforated slab at the side where the laser entered the film (top surface) and measuring the diameter of all the pores visible in that image (e.g., being at least 10 pores). Other imaging techniques can be utilized for characterization of porous films produced with the laser perforation technique of the disclosure. Information illustrative of pore morphology for several porous films is presented in Table III. Representative images of example porous films (e.g., films obtained under conditions A, B, H, and I) are shown in FIG. 6, which are based on polyetherimide films (Ultem™ 1000).

Figure 6:
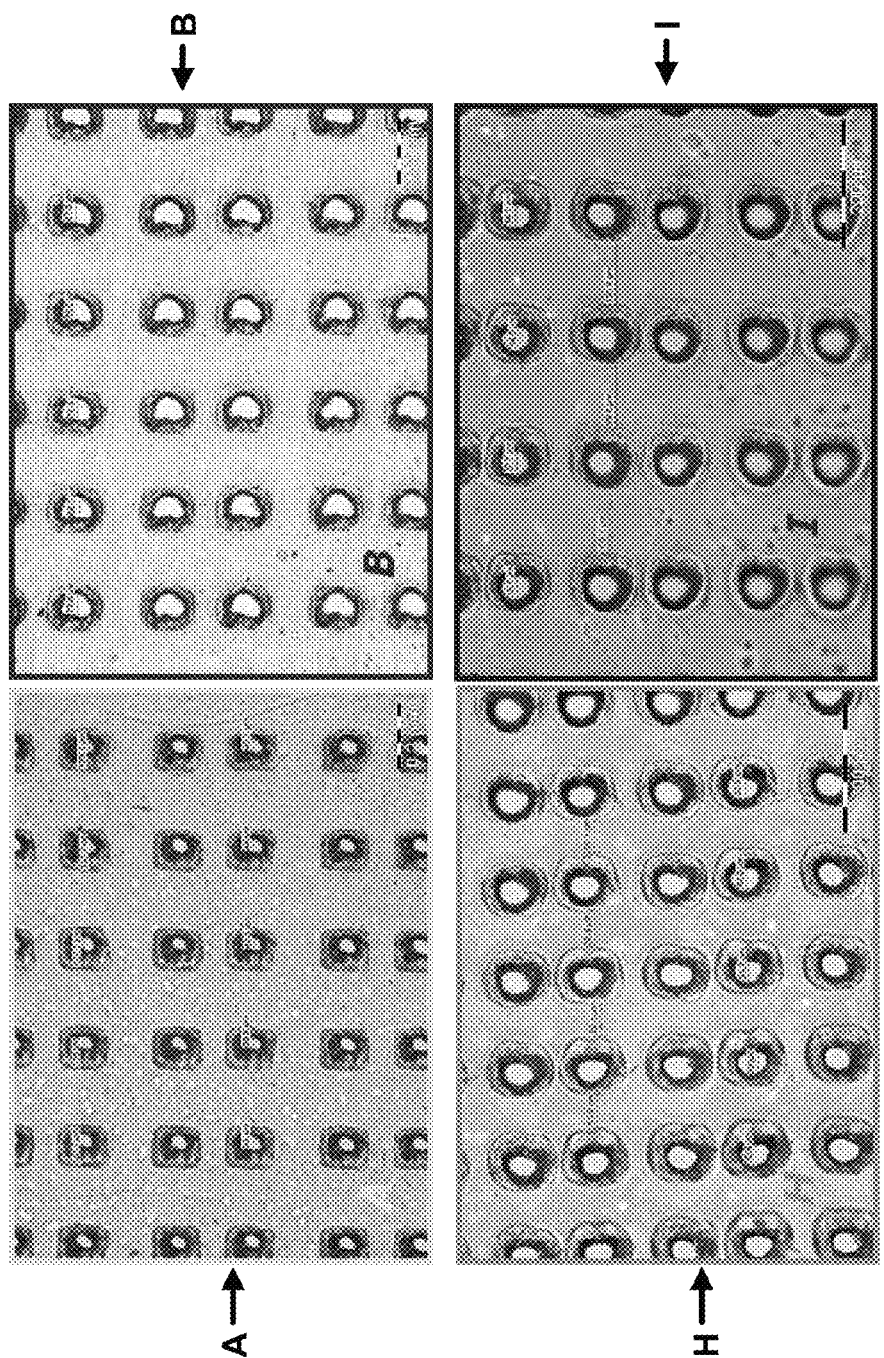
FIG. 6 illustrates optical images of example Ultem CRS 5001 porous films produced in accordance with at least certain aspects of the disclosure.

In one aspect, as demonstrated by imaging data in FIG. 6, for example, the disclosed technique can control pore size and pore distribution via manipulation of operational parameters of a laser utilized for laser perforation. In the example films shown in FIG. 6, characteristic pore size ranges from about 200 μm to about 30 μm. Such characteristic size can be adjusted, e.g. reduced, by customizing (e.g., optimizing) equipment settings and laser operational parameters for a specific polymeric film utilized as precursor to the porous film that is to be formed by laser perforation. The cycle time can also be manipulated by also modifying the laser parameters (such as, frequency, sweeping speed, and/or power output).

It can be appreciated from the images in FIG. 6 that under certain conditions, the region of laser-matter interaction can be greater than the pore—e.g., characteristic size of laser-film interaction zone is larger than the characteristic size of the opening defining the pore. Without wishing to be bound by theory, simulation, and/or modeling, the difference between the size of the laser-film interaction zone and the size of such opening can be attributed to a systematic distribution (e.g., a Gaussian distribution) of the laser intensity on the particular equipment utilized for the laser perforation. In one embodiment, high edge quality can be obtained by homogenizing the spatial distribution of the laser intensity in order to provide a more uniform intensity distribution, also known as "topping". Such topping can for example be achieved by using a beam homogenizer leading to a flat-top laser beam, which ensures a most uniform illumination of the surface by the laser beam. Regulating the spatial distribution of laser intensity (by "topping", for example) of a laser employed in the disclosed laser perforation technique can improve morphology of pores generated by such a technique.

Figure 7A:
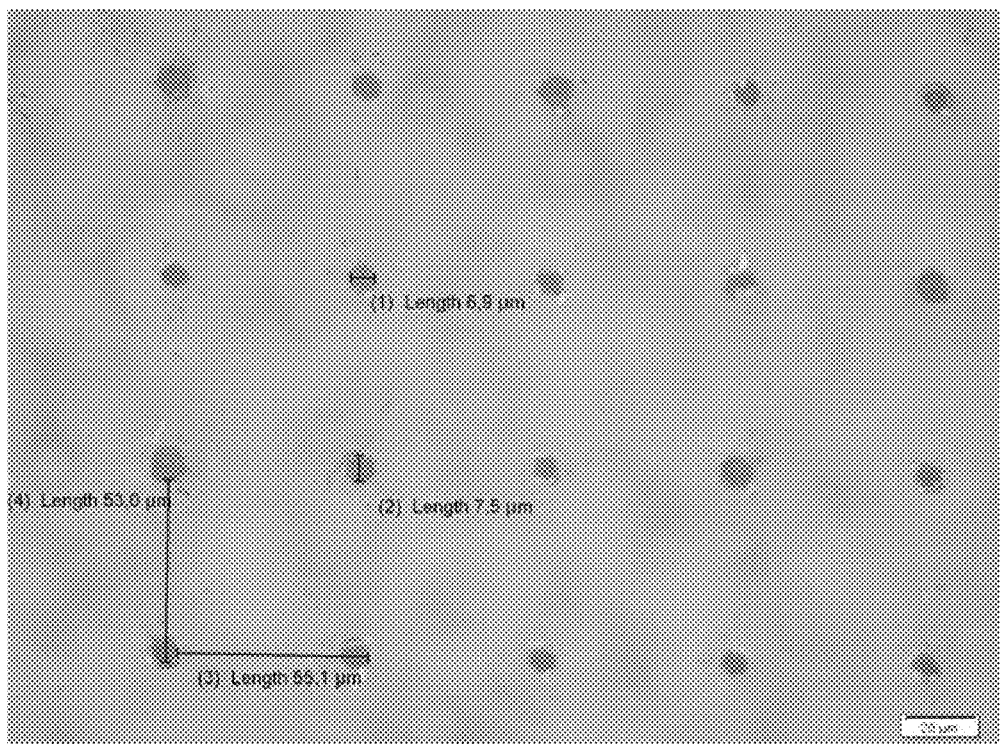
FIG. 7A illustrates optical images of example Ultem CRS 5001 porous films produced in accordance with at least certain aspects of the disclosure.
Figure 7B:
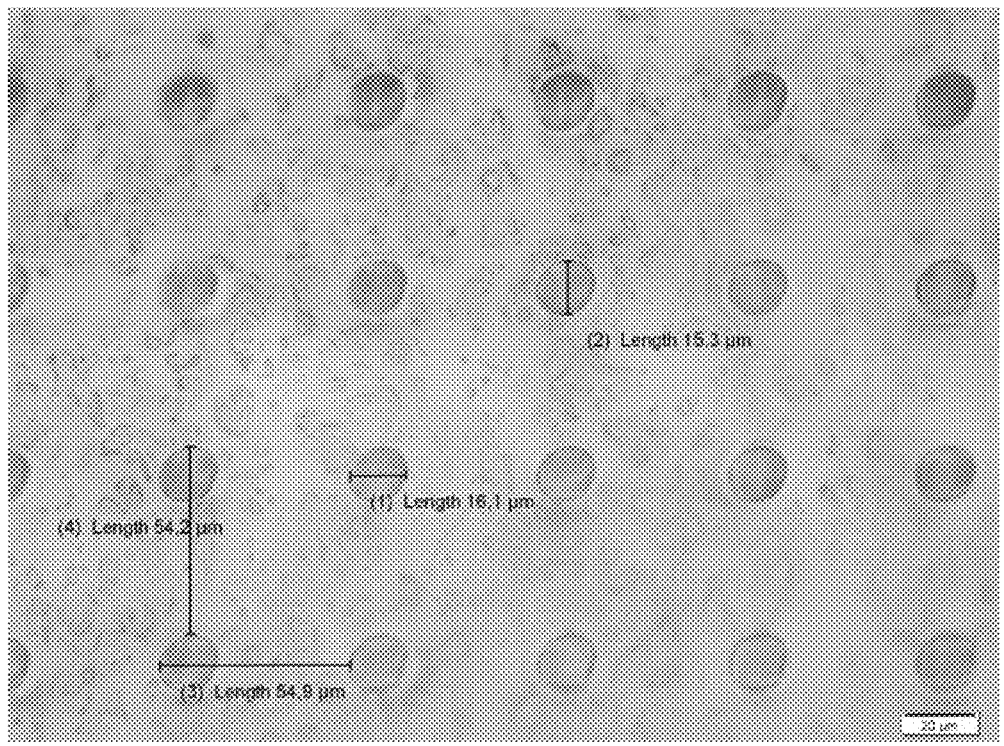
FIG. 7B illustrates optical images of example Ultem CRS 5001 porous films produced in accordance with at least certain aspects of the disclosure.
Figure 8:
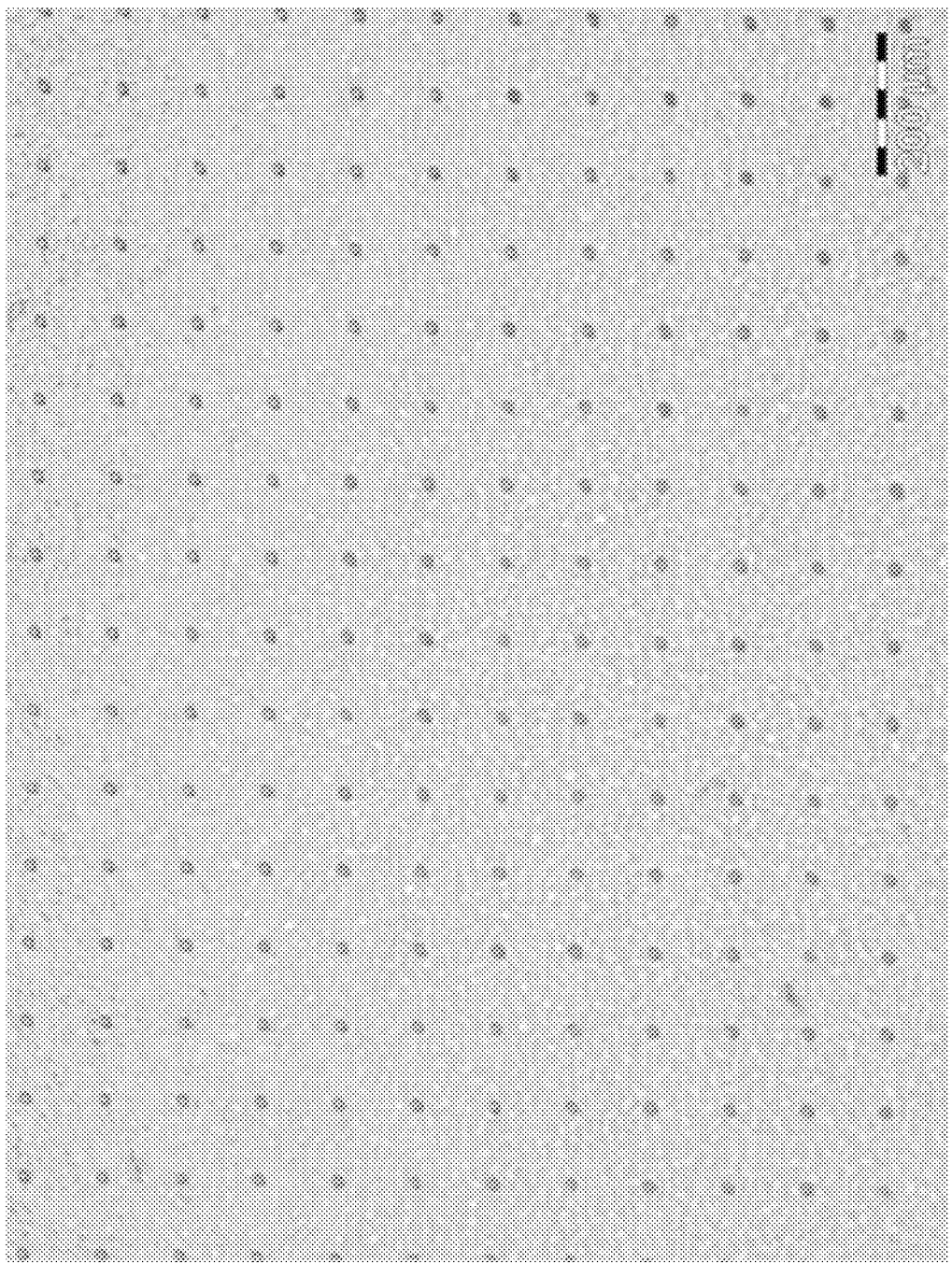
FIG. 8 illustrates an optical image of example Ultem CRS 5001 porous films produced in accordance with at least certain aspects of the disclosure.

FIGS. 7A-7B and FIG. 8 presents images of an example porous film prepared in accordance with the laser perforation technique described herein. The sample was prepared by using a UV laser with the settings presented in Table II. The film is a polyetherimide film (Ultem™ CRS 5001) having a nominal thickness of 25 μm. In can be appreciated that the pore size can range from about 6 μm to about 15 μm under the applied laser perforation conditions. FIG. 7A shows a surface ("entry panel") of the porous film where the laser beam enters the film. FIG. 7B shows a surface ("exit panel") of the porous film where the laser beam exits the film. The "entry" panel presents an image of the porous structure on a portion of the surface of the film that is first exposed to the laser beam utilized to form the pores, whereas the "exit" panel presents an image of the porous structure on an opposite surface of the film. From the images it can be appreciated that porous size and pore separation at the "entry" surface, which is the surface of the film that is first exposed to the laser film, can differ from the pore size and pore separation at the "exit" surface. In one aspect, pores in the "exit" surface can have pore sizes that are about 10 μm smaller than the pore sizes at the "entry" surface. In another aspect, the pore separation at the "exit" surface can be more similar to the pore separation at the "entry" surface; the fluctuations between such sizes being less than about 1.5 μm. Without wishing to be bound by theory, modeling, and/or simulation, discrepancy in pore size at the "entry" and "exit" surfaces can be attributed to the dynamics of melting and evacuation of film material, and can be further optimized by the laser perforation conditions.

FIG. 8 shows that the laser perforation technique as described herein allows the preparation of a porous film, with a very high positional control of pore creation. As described herein, one or more than pore size, pore density, fabrication speed, pore pattern, or the like, can be regulated (e.g., optimized) by suitably configuring equipment settings (e.g., configuration of a microcontroller) and/or laser characteristics. It can be appreciated that pore sizes in the example film illustrated in FIGS. 7A-7B and FIG. 8 are smaller than pore sizes in the example films illustrated in FIG. 6. Also, it can be appreciated that pores in the example film illustrated in FIGS. 7A-7B and FIG. 8 show no signs of material melting or burrs, or any other form of surface damage by heating or carbonization.

Figure 9:
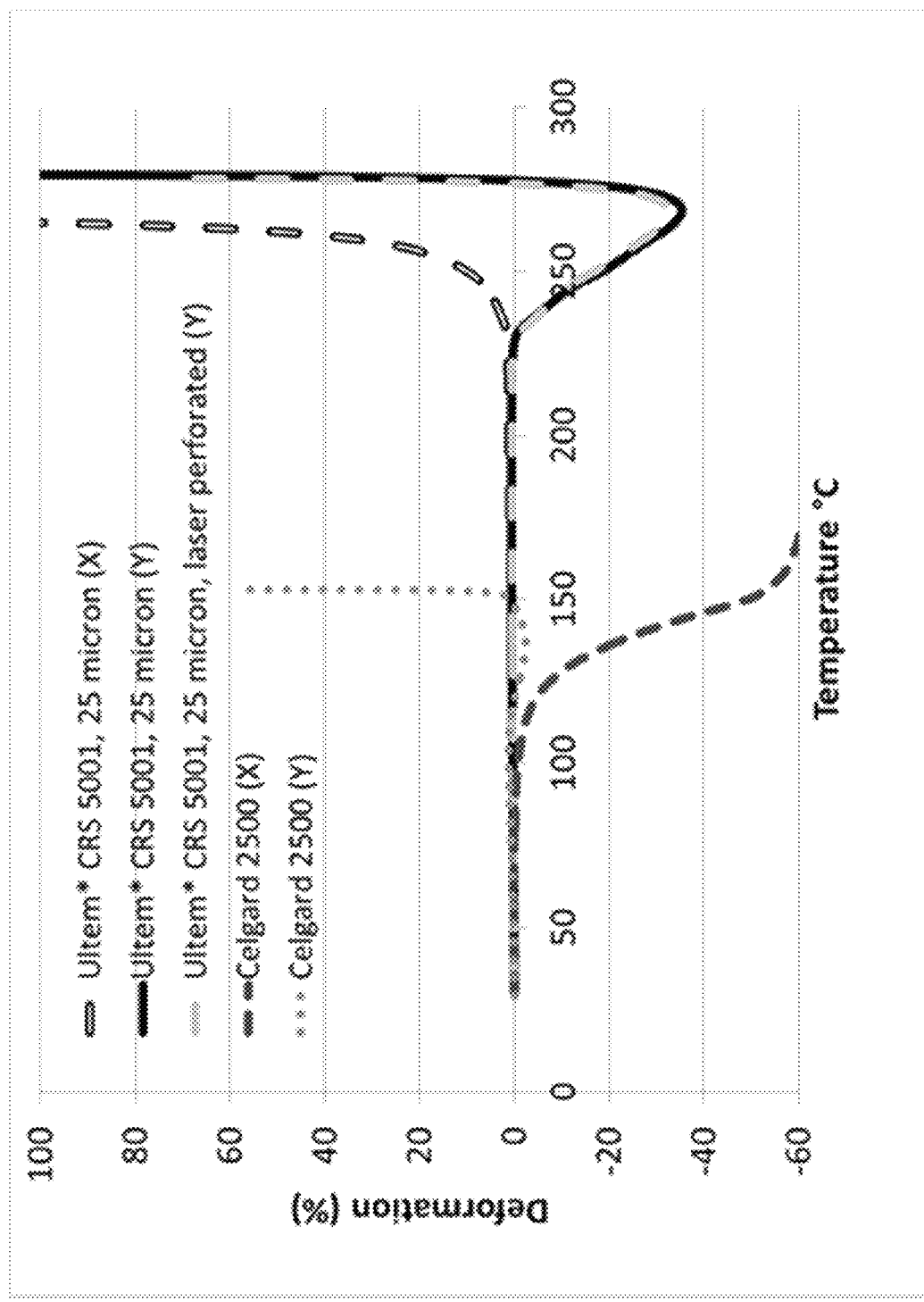
FIG. 9 illustrates the deformation behavior of various films as a function of temperature.

The High Temperature Melt Integrity (HTMI) of a battery separator is a key property to assure the physical separation of the two electrodes by the separator, even at extreme conditions of high temperature. The HTMI of separators is defined here as the temperature at which 5% deformation has occurred. FIG. 9 shows the deformation of films as a function of temperature (i.e. the HTMI performance of films), as measured on a TA Instruments Q800 DMA with a film tension setup. Films of about 10 mm long and about 3 mm wide were tested. The sample is held with a constant 0.02 N load while the temperature is ramped at 5° C./min up to failure of the sample. Samples were measured in two directions, coded as direction "X" and "Y". FIG. 9 shows the deformation behavior of commercial Celgard 2500 separators, which shows that this sample reaches 5% deformation at 121° C. (X-direction) or 152° C. (Y-direction). It is evident that at about 160° C., this type of separator does no longer exhibit sufficient dimensional stability in order to be functional as a physical separator between electrodes in a battery environment. FIG. 9 also shows that the dimensional stability of Ultem™ CRS 5001 film (25 micron thick) is significantly higher, which shows that this sample reaches 5% deformation at 242° C. (X-direction) or 237° C. (Y-direction). FIG. 9 clearly shows that the dimensional stability of the Ultem™ CRS 5001 film remains outstanding, even after laser perforation according to the settings in Table II, showing a 5% deformation at 237° C. (Y-direction).

The air permeability of porous films (which is related to the ionic conductivity of the porous film in the final battery application) was measured on a Gurley Densometer 4118 coupled to a Genuine Gurley 4320 Automatic Digital Timer according to JIS 8117. The commercial Celgard 2500 separator was measured to have an air permeability of 217 s/100 cc. The Ultem™* CRS 5001 film (25 micron thick) after laser perforation according to the settings in Table II gave an air permeability of 19 s/100 cc, which indicates that these laser-perforated films are permeable, and that the permeability is much higher as compared to traditional battery separators. To one experienced in the field, it is clear that high permeability will provide high ionic conductivity, which will allow for faster charging and discharging of the final battery or capacitor system.

In certain embodiments, the disclosed laser perforation technique can be combined with a mask opaque and resistant to electromagnetic radiation emitted from a laser that enables the laser perforation, the mask defining a predetermined porous structure and the surface of a precursor polymeric film being exposed to the electromagnetic radiation through the porous structure in the mask. For instance, the mask can be a UV blocking mask having a predetermined porous structure.

From the subject specification and annexed drawings, it is readily apparent that the disclosed laser perforation technique can be superior to traditional pore-formation methods such as needles, punches, or drills, i.e. mechanical perforation. Tool breakage is one of the most common failures in small-hole mechanical drilling (reference E. Aoyama, H. Inoue, T. Hirogaki, H. Nobe, Y. Kitahara, T. Katayama, Comp. Struct. 32 (1995) 567-573). Secondly, it is difficult to manufacture mechanical drills with a diameter of less than 200 micrometer. In addition, the laser perforation technique has low-adoption threshold as investment costs in laser technology have decreased substantially.

In contrast to implementation which $CO_2$ (10.6 μm) or Nd:YAG (1064 nm) lasers, implementation of the disclosed laser perforation technique with UV or excimer lasers, for example, to generate porous films (e.g., for application as battery separator films) with high control of the porous structure through the manipulation of the laser parameters, can result in low charring or burning upon interaction of the UV lasers with thermoplastics.

It should also be appreciated that the minimal focus diameter of laser beam used for the disclosed laser perforation technique and, thus, the minimal size or resolution of the perforated geometries, is proportional to the wavelength of the laser used. In one aspect, the theoretical optical resolution is twice the laser wavelength. From a practical point of view, in one aspect, the excimer laser can drill holes approaching about 1 micrometer in diameter because the laser wavelength is about three to four times smaller and represents another advantage to using a $CO_2$ (10.6 μm) or Nd:YAG (1064 nm) laser.

It should also be appreciated that the major drawback of film perforation with infrared lasers, such as a Nd:YAG (1064 nm) laser, is the existence of a heat-affected zone (HAZ) that is formed around the laser-drilled hole (reference K. C. Yung, S. M. Mei, T. M. Yue, Journal of Materials Processing Technology (2002), Volume 122, Issues 2-3, Pages 278-285). This is because the material-removal mechanism with infrared lasers is a thermal mechanism (melting, evaporation, or vaporization). One of the most important methods to reduce the thermal effects is to use UV lasers in the perforation of holes. The high energy UV photons can directly atomize the surface material in a process known as photo-ablation, which is associated with a photochemical mechanism rather than with a photo-thermal mechanism. Although there is enough evidence to confirm that the thermal mechanism still accompanies the photochemical mechanism, photo-ablation does enhance the ability of UV lasers to produce micro-pores with good quality (reference R. Srinivasan, B. Braren, Chem. Rev. 89 (6) (1989) 1303-1316).

It should be appreciated that application of laser perforation (or laser-assisted drilling) to producing highly controlled, porous solid-state films is not limited to separator films, and it can be extended to other application areas. Additionally or in the alternative, the precursor materials, e.g., the materials to be perforated, are not limited to polyetherimides. As an example, the precursor material can comprise most any light-absorbing resin compositions, which either inherently absorb the laser light, or containing, in certain embodiments, additional light-absorbing components, such as dyes. As another example, the precursor material can comprise one or more of polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or their copolymers, or blends thereof.

As described herein, the polymeric films having controlled pore morphology can be applied as regulatory porous films in a variety of functional environments (either aqueous or non-aqueous) in which permeability to a specific elements (e.g., ions of specific sizes; compounds of specific sizes; such as drugs or nanoparticles; etc.) is to be regulated or permitted under specific operational conditions.

For example, the solid-state porous films of the disclosure can be utilized as battery separator films in energy-storage battery applications, such as battery applications or capacitor applications. Such porous separator films can prevent physical contact between the electrodes in a battery or a capacitor. Porosity permits ion transport throughout the electrolytic cell during charging and discharging. In certain embodiments, high porosity can be beneficial because it can permit more and/or faster transport of ions in the electrolyte solution through the separator. Pore sizes can be in the micrometer range with a size distribution inherent to the production method of the porous film. In one aspect, the pore size is smaller than the particle size of the electrode components and the pores are uniformly distributed.

In one application scenario, a laser-ablated porous film (see, e.g., FIG. 4) can be combined, or arranged in proximity, with a porous polyethylene film to form a battery separator having one or more of the following separator properties:
1. Thermal shutdown mechanism at temperatures ranging from about 100° C. to about 130° C.
2. High temperature melt integrity (HTMI) at temperatures exceeding 180° C.
3. Thermal shutdown mechanism and HTMI at low total film thickness (for example, 32 μm=$t_{por}$+$t_{PE}$, where $t_{por}$ is the thickness of the laser-ablated porous film and $t_{PE}$ is the thickness of the PE film; thinner combined films are contemplated)
4. Improved separator wettability as compared to the stand-alone polyethylene separator, or as compared to polyethylene/polypropylene multi-layer separators due to the lower electrolyte contact angle of the laser-perforated film.

Figure 10:
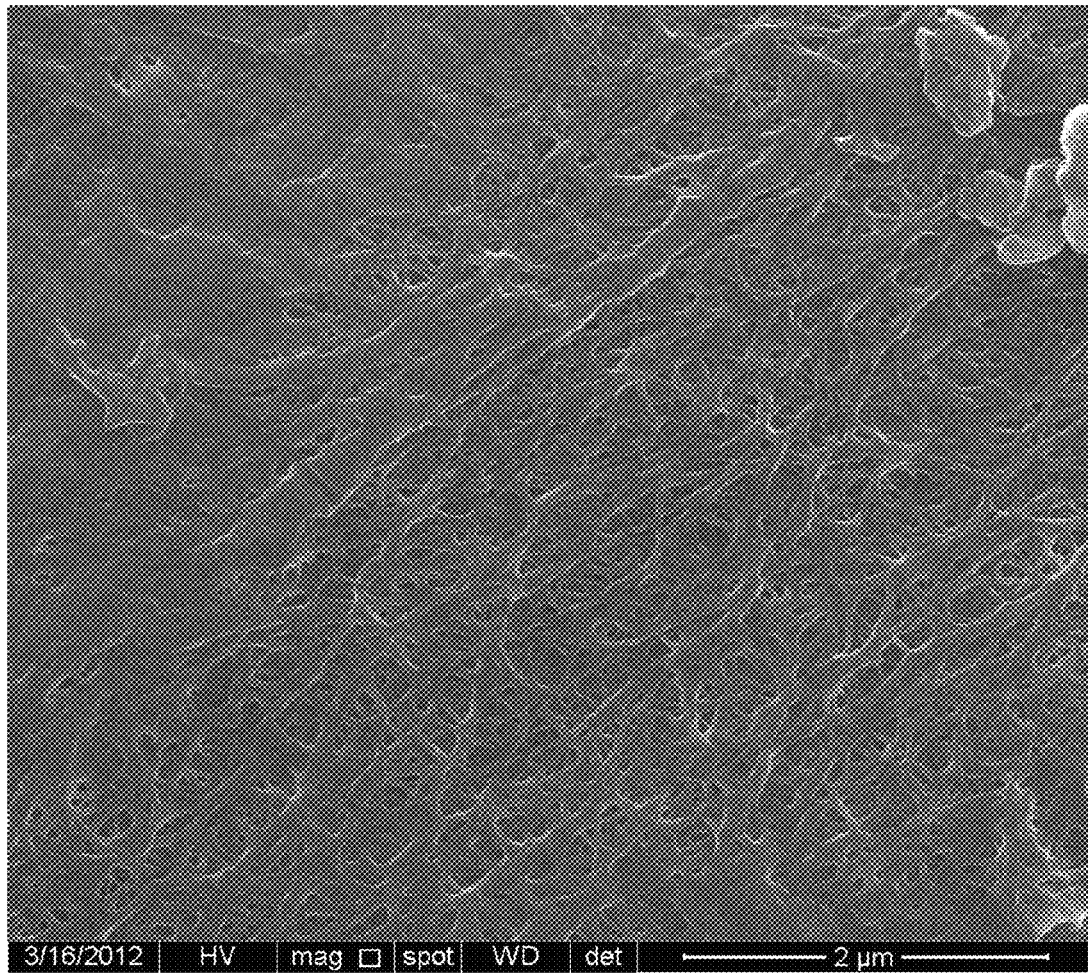
FIG. 10 illustrates a scanning electron microscopy (SEM) image of a surface of porous polyethylene (PE) film in accordance with at least certain aspects of the disclosure.

In certain embodiments, the PE film can be a 7 μm commercially available porous film with an air permeability of 183 s/100 cc (see e.g. FIG. 10), or a 10 μm commercially available porous film with an air permeability of 268 s/100 cc, or a 25 μm commercially available porous film with an air permeability of 294 s/100 cc, or a 25 μm commercially available porous film with an air permeability of 192 s/100 cc. Thicker PE films would lead to too thick overall film thickness ($t_{por}$+$t_{PE}$) and are, therefore, not desirable. Thinner PE films would not lead to an appropriate shutdown mechanism, i.e. full closure of the porous structure and a significant increase in separator resistance would not be achieved, and are, therefore, not desirable. In one aspect, the disclosed battery separator films have a suitable shutdown mechanism and can be combined with a high temperature melt integrity layer, wherein such layer does not significantly restrict ionic conduction through the total film.

It should be appreciated that the disclosed laser perforation (or laser-assisted drilling) technique to produce highly-controlled porous films is not limited to separator films having HTMI and/or embedded thermal shutdown mechanism. The technique and the porous films generated by applying such technique can be implemented in other application areas, such as packaging, tipping paper, or breathable films.

As described herein, the disclosure provides porous thin films having various pore structures. For example, the disclosure provides a thin film comprising a slab defining a plurality of pores distributed in a predetermined arrangement, wherein the plurality of pores can have a distribution of sizes bound by a predetermined magnitude. In one aspect, the slab can have having a thickness of at most 100 μm, and each pore of the plurality of pores can pierce through the slab. Various distributions of sizes can be obtained via the application of the disclosed techniques of thin-film preparation. In one aspect, the distribution of sizes can comprise sizes that can range from about 1 μm to about 200 μm. In another aspect, the distribution of sizes can comprise sizes that can range from about 16 μm to about 24 μm. In another aspect, the distribution of sizes can comprise sizes that range from about 30 μm to about 35 μm. In yet another aspect, the distribution of sizes can comprise sizes ranging from about 31 μm to about 37 μm. In yet another aspect, the distribution of sizes can comprise sizes ranging from about 34 μm to about 38 μm. In still another aspect, the distribution of sizes can comprise sizes ranging from about 41 μm to about 48 μm. In another aspect, the distribution of sizes can comprise sizes ranging from about 56 μm to about 62 μm. In another aspect, the distribution of sizes can comprise sizes ranging from about 57 μm to about 60 μm. In yet another aspect, the distribution of sizes can comprise sizes ranging from about 66 μm to about 72 μm.

In certain embodiments, the slab can be formed from a polymer or a polymeric material. In one aspect, the polymer can comprise one or more of polyetherimide, polybutylene terephthalate, polyethylene terephthalate, polyethylene naphthalate, polyphenylene oxide, polymethylpentene, polyimide, polyetheretherketone, polyethylene, polypropylene, polyamide, or polyphenylene sulfide. In other embodiments, the slab can be formed from a non-polymer material.

In another aspect, the polymer can comprise UV absorbing chemicals, such as publicly known UV absorbing agents from the groups of benzotriazole or benzophenone, for example, 2-(2'-hydroxy-5'-methylphenyl)-benzotriazole, 2-(2'-hydroxy-3'-tert-butyl-5'-methylphenyl)-5-chlorobenzotriazole, 6-(2-benzotriazole)-4-t-octyl-6'-t-butyl-4'-methyl-2,2'-methylene bisphenol, 2,2'-dihydroxy-4,4'-dimethoxy-benzophenone and 2,2',4,4'-tetrahydroxy-benzophenone.

In one aspect, each of the plurality of pores can be formed via laser perforation or laser drilling. In another aspect, each of the plurality of pores is formed via laser perforation of the slab or laser drilling of the slab, a surface of the slab being coupled to a mask transparent to electromagnetic radiation emitted from a laser that enables the laser perforation, the surface exposed to the electromagnetic radiation through the mask. The laser that enables the laser perforation can emit radiation having wavelengths below about 1000 nm. In such scenarios, in one aspect, the slab can be formed from a material that can absorb electromagnetic radiation having wavelengths below about 1000 nm. In another aspect, the slab can be formed from a material containing at least one component that absorbs electromagnetic radiation in the UV portion of the electromagnetic spectrum.

In one aspect, the predetermined magnitude that bounds the distribution of size can be determined at least in part by one or more operational parameters of the laser, the one or more operational parameters comprising one or more of laser speed, laser power, laser frequency, laser focus condition, or laser fill factor. In another aspect, the predetermined magnitude can be determined at least in part by a composition of a material forming the slab.

For another example, the disclosure can provide a thin film, comprising a first slab of a first material, wherein the first slab can have a plurality of pores distributed in a predetermined arrangement, the plurality of pores having a distribution of sizes bound by a predetermined magnitude. The thin film also can comprise a second slab of a second material, wherein the second slab can be coupled to the first slab and can have the plurality of pores distributed in substantially the predetermined arrangement. In the thin film, in one aspect, the first slab and the second slab can have a combined thickness of at most 100 μm, and each pore of the plurality of pores can pierce through the first slab and the second slab.

The high temperature melt integrity layer and the low melting (shutdown) layer can potentially also be perforated at the same time.

Based at least on the disclosed porous films, in one embodiment, a device is provided. The device can comprise a polyethylene porous thin film, and a slab arranged in proximity of the polyethylene porous thin film and defining a plurality of pores distributed in a predetermined arrangement, the plurality of pores having a distribution of sizes bound by a predetermined magnitude. In one aspect, the slab can have a thickness of at most 100 μm, and each pore of the plurality of pores can pierce through the slab. In one example scenario in which the device is utilized in energy storage applications, the composite film can be contained in a battery, thereby forming an HTMI battery separator. In addition or in the alternative, the composite film is contained in an electrolytic capacitor.

In one aspect, the polyethylene porous thin film can melt at temperatures ranging from about 100° C. to about 130° C., thereby providing a shutdown mechanism for the device. In another aspect, the polyethylene porous thin film can have a thickness of at least 5 microns. In yet another aspect, the polyethylene porous thin film and the slab form a substantially planar composite film exhibiting high temperature melt integrity (HTMI) at temperatures greater than about 180° C. and a shutdown mechanism at temperatures in between 100 and 130° C.

While the systems, devices, apparatuses, protocols, processes, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent from consideration of the specification and annexed drawings, and practice of the subject disclosure as described herein. It is intended that the specification, illustrations in the annexed drawings, and examples be considered as non-limiting illustrations only, with a true scope and spirit of the disclosure being indicated by the following claims.

What is claimed is:
1. A perforated film comprising:
  a slab defining a plurality of pores distributed in a predetermined arrangement, the plurality of pores having a mean diameter less than about 50 μm;
  wherein the plurality of pores are formed in the slab with a laser having a wavelength less than about 400 nm and the slab has a transmission of the laser light of equal to or less than about 70% measured at a thickness of the slab of 100 micrometer or less; and wherein the slab has a high temperature melt integrity (HTMI) equal to or exceeding about 180° C.

2. The perforated film of claim 1, wherein the transmission of the laser light is measured according to ASTM D1003-00, Procedure A, using D65 illumination, 10 degrees observer.

3. The perforated film of claim 1, wherein the slab is formed from a polymer comprising one or more of polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or a copolymer and/or blend thereof.

4. The perforated film of claim 3, wherein the polymer comprises an ultraviolet absorbing additive selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, or combinations comprising at least one of the foregoing.

5. The perforated film of claim 1, wherein each of the plurality of pores is formed via laser perforation or laser drilling.

6. The perforated film of claim 1, wherein each of the plurality of pores is formed via laser perforation of the slab or laser drilling of the slab, a surface of the slab being coupled to a mask, where the mask is locally transparent to electromagnetic radiation emitted from a laser in a pre-defined manner that enables laser perforation of the slab through the areas of the mask that are substantially transparent to the electromagnetic radiation.

7. The perforated film of claim 1, wherein the slab is formed from a material containing at least one polymeric component that absorbs electromagnetic radiation having wavelengths below about 400 nm.

8. The perforated film of claim 1, wherein the slab is formed from a material containing at least one component that absorbs electromagnetic radiation having wavelengths below about 400 nm.

9. The perforated film of claim 1, wherein the slab has a total hole area of 10 to 80%.

10. The perforated film of claim 1, wherein the slab comprises a plurality of material layers.

11. The perforated film of claim 1, wherein the slab is integrated as high temperature separator for lithium ion battery or a separator for an electrolytic supercapacitor or a support membrane for a fuel cell membrane.

12. A method, comprising:
providing a slab having a high temperature melt integrity (HTMI) equal to or exceeding about 180° C.; and
removing material from the slab by exposing the slab to a laser having a wavelength less than about 400 nm to produce a plurality of pores in the slab, the plurality of pores having a mean diameter less than about 50 µm and the slab having a transmission of the laser of equal to or less than about 70% measured at a thickness of the slab of 100 micrometer or less.

13. The method of claim 12, wherein the transmission of the laser light is measured according to ASTM D1003-00, Procedure A, using D65 illumination, 10 degrees observer.

14. The method of claim 12, further comprising arranging the slab in proximity of a porous thin film.

15. The method of claim 14, wherein the porous thin film if formed from a process that is different from the process used to form the porous slab.

16. The method of claim 14, wherein the porous thin film comprises a polymer selected from polymethyl methacrylate, polystyrene, polyethylene, polypropylene, polytetrafluoroethylene, polyvinylidene fluoride, polycarbonate, poly(4-methylpentene), cyclic olefin copolymers, polyamide, aromatic polyamide, poly(amide-imide), polyoxymethylene, polyphthalamide, polysulfone, polyethersulfone, polyphenylsulfone, liquid crystalline polymers, polyetherimide, polybutylene terephthalate, polyethylene terephthalate, polyethylene naphthalate, polyphenylene oxide, polyimide, polyketone, polyetherketone, polyetheretherketone, polyphenylene sulfide, or a copolymer and/or blend thereof.

17. The method of claim 16, wherein the polymer comprises one or more ultraviolet absorbing additives selected from hydroxybenzophenones, hydroxybenzotriazoles, hydroxybenzotriazines, cyanoacrylates, oxanilides, benzoxazinones, benzylidene malonates, hindered amine light stabilizers, nano-scale inorganics, or combinations comprising at least one of the foregoing.

18. A composite film comprising:
a porous thin film; and
a slab arranged in proximity of the porous thin film and defining a plurality of pores distributed in a predetermined arrangement, the plurality of pores having a mean diameter less than about 50 µm;
wherein the slab has a high temperature melt integrity (HTMI) equal to or exceeding about 180° C. and the slab having a transmission of the laser of equal to or less than about 70% measured at a thickness of the slab of about 100 micrometer or less.

19. The composite film of claim 18, wherein the transmission of the laser light is measured according to ASTM D1003-00, Procedure A, using D65 illumination, 10 degrees observer.

20. The composite film of claim 18, wherein the porous thin film is based on polyethylene and melts at temperatures ranging from about 100° C. to about 130° C., thereby providing a shutdown mechanism.

21. The composite film of claim 18, wherein the polyethylene porous thin film has a thickness of at least 5 microns.

22. The composite film of claim 18, wherein the composite film is contained in a battery, thereby forming an HTMI battery separator.

23. The composite film of claim 18, wherein the composite film is contained in an electrolytic capacitor as a separator.

24. The composite film of claim 18, wherein the composite film is contained in a fuel cell as a support membrane.

* * * * *